No. 705,747. Patented July 29, 1902.
R. M. FRASER.
SUGAR BEET HARVESTER.
(Application filed Mar. 6, 1899.)

(No Model.) 2 Sheets—Sheet 1.

Witnesses: Inventor,
Russell M. Fraser

No. 705,747. Patented July 29, 1902.
R. M. FRASER.
SUGAR BEET HARVESTER.
(Application filed Mar. 6, 1899.)
(No Model.) 2 Sheets—Sheet 2.
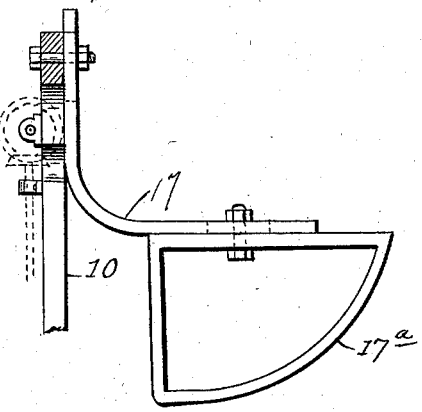
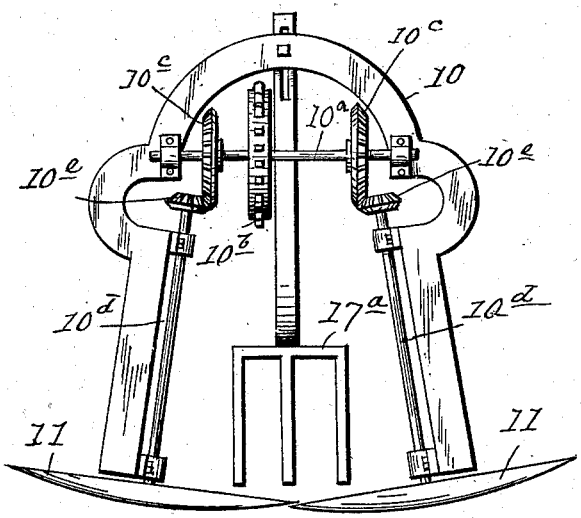
Witnesses
Inventor
Russell M. Fraser.
By
Attorney

UNITED STATES PATENT OFFICE.

RUSSELL M. FRASER, OF NORFOLK, NEBRASKA.

SUGAR-BEET HARVESTER.

SPECIFICATION forming part of Letters Patent No. 705,747, dated July 29, 1902.

Application filed March 6, 1899. Serial No. 708,020. (No model.)

*To all whom it may concern:*

Be it known that I, RUSSELL M. FRASER, a citizen of the United States, and a resident of Norfolk, Madison county, Nebraska, have invented certain new and useful Improvements in Sugar-Beet Harvesters, of which the following is a specification.

The object of my invention is to produce a machine which will cut the tops from the beets while the latter are in the ground and dig the roots and separate them from the tops in an effective manner with a minimum of waste, and a further object is to provide a machine of this character which may be operated by one man.

The manner in which I attain the objects above set forth and others of simplicity of construction and ease of operation is illustrated in the accompanying drawings, which form a part of this application for a patent, in which—

Figure 1:
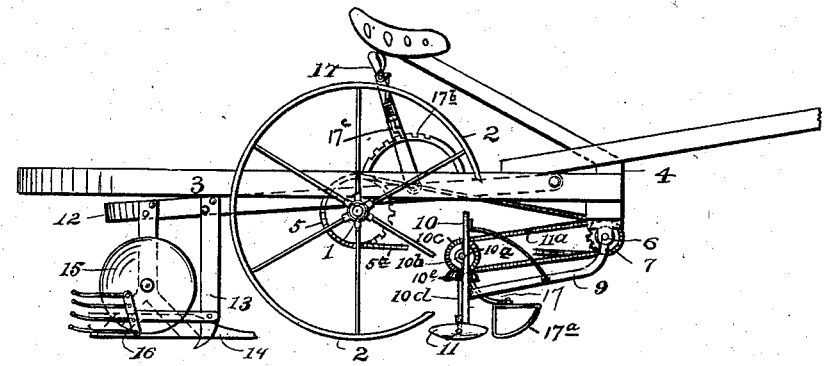
Figure 2:
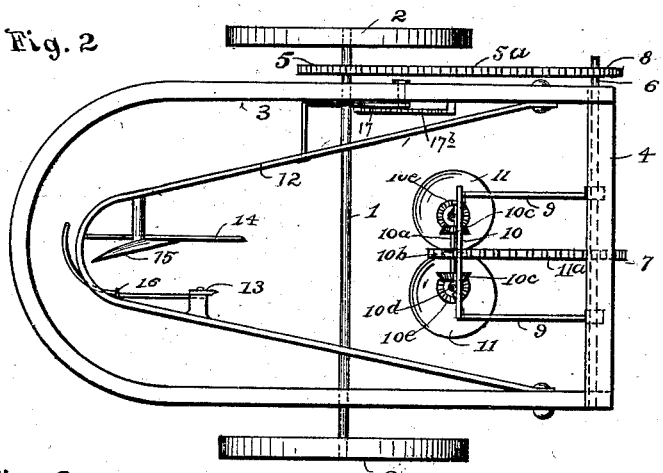
Figure 3:
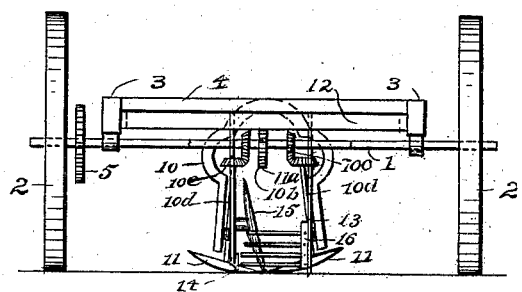

Figure 1 is a side elevation of a machine made in accordance with my invention. Fig. 2 is a top plan view of the same, and Fig. 3 is a rear elevation. Fig. 4 is a view, partly in section and partly in side elevation, showing the shoe-gage and yoke. Fig. 5 is a rear elevation showing manner of securing the gage to the yoke.

Generally speaking, my machine consists of two parts, one for separating the tops from the roots and the other for digging the roots; but both of said parts are operable by the same power.

In the drawings, 1 represents the main axle or drive-shaft of my machine, which is supported by the usual ground-wheels 2. Secured to and supported by the axle is a main frame which is composed of parallel side bars 3 and a front end bar 4, which connects the forward ends of the side bars. Mounted on the main axle is a sprocket-wheel 5, which by a suitable clutch mechanism is geared to one of the ground-wheels 2, so that it may be thrown in and out of gear by the rider, as may be required. Suspended from the front cross-bar in suitable hangers is a small shaft 6, on the center of which is mounted a sprocket-wheel 7, and on one end of said shaft 6, in line with the sprocket-wheel 5, is mounted a second sprocket-wheel 8. An endless link belt or chain $5^a$ is carried by the sprocket-wheels 5 and 8 and conveys the power received on the former from the ground-wheel to which it is geared, thus turning the shaft 6 and the sprocket-wheel 7, mounted thereon, all in a well-known manner. Secured to the shaft 6 are rearwardly and downwardly extending arms 9, which support at their opposite or lower ends a yoke or frame 10, which in turn supports the topping mechanism, to be described. This yoke or frame is preferably made of malleable iron and carries in its upper part a small shaft $10^a$, in the center of which is mounted a sprocket-wheel $10^b$ and on each side of said sprocket a bevel-pinion $10^c$. To the downwardly-extending arms of the yoke 10 are secured shafts $10^d$, on the upper ends of which are carried bevel-pinions $10^e$, which mesh with the like pinions $10^c$ on the shaft $10^a$, and on the lower ends of said shafts $10^d$ are mounted concave or dished disks 11. The disks 11 are positioned so that their peripheries touch and are set at an angle to the plane of the ground. A sprocket-chain $11^a$ is carried on the sprocket-wheels 7 and $10^b$ and communicates power from the former to the latter, and said power is transmitted to the disks 11 by means of the shaft $10^a$, bevel-pinions $10^c$ and $10^e$, and shafts $10^d$, as will clearly appear from Fig. 2, thus causing the said disks to rotate upon the forward movement of the machine. I prefer to hang the said yoke loosely from the front shaft 6 by means of the arms 9, so that the latter may turn slightly on the shaft, thus permitting the cutting mechanism to yield as the wire shoe-gage slides over the top of the beets. Secured to the yoke by a forwardly-extending arm 17 is a shoe-gage $17^a$, which is formed of parallel wires bent in the shape of a sled-runner. This gage is set just forward of the cutting-disks 11 and controls the depth to which said disks may cut the top of the beets. The wires are set far enough apart to permit of the passage between them of the beet-tops. This gage is both vertically and horizontally adjustable.

Bolted to the forward part of the side bars 3 is a wrought-iron frame 12, which extends rearwardly and is bent upon itself and rests on the axle 1. Bolted to the frame 12 is a standing colter or cutting-blade 13, and to the opposite side of the frame is similarly bolted a landside 14. Extending from the standard of the landside at right angles is a shaft on which is mounted a rolling disk colter 15. Secured to the standing colter and having its teeth extending rearwardly back of the rolling colter is a rake 16. Pivoted to the side of the frame or side bars 3 is a lifting-lever 17 of usual form, which is connected with the frame 12 and by means of which the depth at which the colters may run is regulated, said lever having a spring-pawl 17°, which engages the notches in a segment 17ᵇ in the usual manner.

Having thus described my invention, what I claim as new, and desire to secure by Letters Patent, is—

1. In a machine of the character described, topping mechanism composed of rotating disks, shafts supporting and rotating said disks, means for rotating said shafts operable from the ground-wheels of the machine, shoe-gage hung in front of said disks, in combination with a digging mechanism consisting of colters angularly disposed to each other, a landside and means for separating the dirt from the roots unearthed, substantially as set forth.

2. In a machine of the character described, topping mechanism composed of horizontally-disposed disks, shafts supporting and rotating said disks, means for rotating said shafts operable from the ground-wheels, shoe-gage hung in front of said disks, in combination with digging mechanism consisting of a standing colter, a rolling colter set at an angle to the standing colter, means for supporting said rolling colter, a landside, means for separating the dirt and the roots dug, a pivoted frame supporting said digging mechanism and means for raising and lowering said frame, substantially as described.

In testimony whereof I affix my signature in presence of two witnesses.

RUSSELL M. FRASER.

Witnesses:
C. W. LEMONT,
CHESTER A. FULLER.